United States Patent [19]

James et al.

[11] Patent Number: 5,641,392

[45] Date of Patent: Jun. 24, 1997

[54] ELECTRODRIFT PURIFICATION OF MATERIALS FOR ROOM TEMPERATURE RADIATION DETECTORS

[76] Inventors: Ralph B. James, 5420 Lenore Ave., Livermore, Alameda County, Calif. 94550; John M. Van Scyoc, III, P.O. Box 93, 65 Main St., Apt. 1, Plainfield, Cumberland County, Pa. 17081; Tuviah E. Schlesinger, 8 Carleton Dr., Mt. Lebanon, Allegheny County, Pa. 15243

[21] Appl. No.: 504,001

[22] Filed: Jul. 19, 1995

[51] Int. Cl.$^6$ ............................................. C25F 1/00
[52] U.S. Cl. .................. 205/687; 205/766; 205/769; 204/515
[58] Field of Search ................ 204/130, 180.1, 204/182.2, 141.5, 515; 205/687, 766, 769

[56] References Cited

U.S. PATENT DOCUMENTS

| | | | |
|---|---|---|---|
| 2,897,126 | 7/1959 | George | 204/130 |
| 4,554,150 | 11/1985 | Whelan | 423/491 |
| 4,581,218 | 4/1986 | Nicolau | 423/491 |
| 4,675,087 | 6/1987 | Tregilgas | 204/134 |
| 4,822,057 | 4/1989 | Faile | 156/614 |

*Primary Examiner*—Arun S. Phasge
*Attorney, Agent, or Firm*—Timothy D. Stanley; Donald A. Nissen; Kurt D. Olsen

[57] ABSTRACT

A method of purifying nonmetallic, crystalline semiconducting materials useful for room temperature radiation detecting devices by applying an electric field across the material. The present invention discloses a simple technology for producing purified ionic semiconducting materials, in particular $PbI_2$ and preferably $HgI_2$, which produces high yields of purified product, requires minimal handling of the material thereby reducing the possibility of introducing or reintroducing impurities into the material, is easy to control, is highly selective for impurities, retains the stoichiometry of the material and employs neither high temperatures nor hazardous materials such as solvents or liquid metals. An electric field is applied to a bulk sample of the material causing impurities present in the sample to drift in a preferred direction. After all of the impurities have been transported to the ends of the sample the current flowing through the sample, a measure of the rate of transport of mobile impurities, falls to a low, steady state value, at which time the end sections of the sample where the impurities have concentrated are removed leaving a bulk sample of higher purity material. Because the method disclosed here only acts on the electrically active impurities, the stoichiometry of the host material remains substantially unaffected.

16 Claims, 2 Drawing Sheets

ELECTRODRIFT PURIFICATION OF MATERIALS FOR ROOM TEMPERATURE RADIATION DETECTORS

STATEMENT OF GOVERNMENT INTEREST

This invention was made with Government support under contract no. DE - AC04 - 94AL8500 awarded by the U.S. Department of Energy to Sandia Corporation. The Government has certain rights in the invention.

BACKGROUND OF THE INVENTION

This invention pertains generally to a method of purifying semiconductor materials and particularly to the use of an applied electric field for the purification of semiconductor material used in radiation detectors.

Many of the commonly used radiation detectors such as Si(Li) or Ge operate most effectively at cryogenic temperatures. However, the need to keep such detectors cooled to cryogenic tempertures poses significant limitations on the use of these materials in many applications, particularly where portability is desired. The general requirement for room temperature operation of a semiconducting material as a nuclear detector and spectrometer is a relatively large band gap energy such that thermal generation of charge carriers is kept to a minimum. Conversely, the requirement for a high resolution gamma ray spectrometer is a small band gap energy such that a large number of electron-hole pairs is created for an absorbed quantum of ionizing radiation. Therefore, a compromise is necessary if a semiconducting material is to be considered for a radiation spectrometer operating at room temperature. The material under consideration should also have a relatively high average atomic number if used in gamma ray spectroscopy to increase the gamma ray interaction probability. High charge carrier mobilities and long charge carrier lifetimes are also needed to ensure efficient charge carrier extraction and minimal effects from position dependent charge collection.

In contrast to the III-V and II-VI semiconductors, such as GaAs and CdTe, which have less than ideal band gap widths and high dark currents making them unattractive candidates for room temperature radiation detection devices, certain nonmetallic, crystalline solids such as mercuric iodide ($HgI_2$), lead iodide ($PbI_2$), thallium bromide (TlBr), indium iodide (InI), thallium bromoiodide (TlBrI), and mercuric bromoiodide (HgBrI) are particularly useful as materials for room temperature radiation detection devices. The distinguishing properties of these materials which make them particularly attractive for use in room temperature radiation detection devices are constituents with relatively high atomic numbers, low electron-hole pair production energy and high intrinsic resistivity. As shown in Table 1, $PbI_2$ and $HgI_2$ (also known as red mercuric iodide or $\alpha$-$HgI_2$, the stable form of $HgI_2$ at room temperature) are semiconductors that possess properties that make them particularly attractive as detector materials for room temperature high resolution x-ray and $\gamma$-ray spectroscopic devices. Mercuric iodide, $HgI_2$, is particularly preferred for this application.

TABLE I

|  | IV, III-V and II-VI Materials | $HgI_2$ & $PbI_2$ |
|---|---|---|
| Average Atomic No. (Z) | <50 | >60 |
| Band Gap (eV) | <1.5 | >2.0 |
| Pair Production Energy Band Gap | 3 | ≈2 |
| Average Resistivity ($\Omega$*cm) | $<1 \times 10^9$ | $>1 \times 10^{12}$ |

One of the primary problems associated with nonmetallic, crystalline semiconducting materials lies in the presence of charge trapping defect sites and electrical instabilities caused by impurities in the starting material or introduced during subsequent processing.

Impurities, either present in the initial bulk material or introduced during detector crystal growth are believed to be one of the largest source of charge trapping defects in $HgI_2$. These impurities affect the crystal structure and disturb the local electric field. In addition, electrically active impurities may move under the influence of an applied field leading to unpredictable and variable electrical properties including high dark current and spectral distortions. These effects lead to both immediate and long term degradation of detector performance. In order to minimize this performance degradation it is desirable to reduce impurity levels to less than $10^{15}/cm^3$. There have been numerous methods proposed for the purification of $HgI_2$. For example, in U.S. Pat. No. 4,581,218 a method for preparing high purity $HgI_2$ is disclosed in which $HgI_2$ is first synthesized and then purified by at least one vacuum distillation. U.S. Pat. No. 4,282,057 discloses a method for producing high purity $HgI_2$ employing polymer controlled crystal growth. Another method of purification of $HgI_2$ is disclosed in U.S. Pat. No. 4,554,150 wherein chemically pure $HgI_2$ is vaporized in an inert gas containing oxygen and iodine and subsequently reevaporated and recrystallized for further purification. Other techniques well known in the art have also been used to purify $HgI_2$, such as zone refining and multiple recrystallizations from solution. While these methods have proven to be effective in producing $HgI_2$ pure enough for radiation detector devices they are difficult to control, time consuming, expensive, the yield of purified material is low and they require extensive handling of hazardous materials including $HgI_2$ itself. Many of the prior art purification methods require the use of high purity starting materials as well as the use of solvents which may be hazardous and/or difficult to dispose of or require extensive reprocessing before they may be reused. Furthermore, as the number of processing steps increases the probability of reintroducing impurities into the $HgI_2$ also increases.

A method of purifying III-V compound semiconductors, semiconducting pseudo-binary alloys and intermetallic semiconductors such as HgCdTe by means of solid state electromigration has been disclosed in U.S. Pat. No. 4,675,087. Here, the impure semiconductor material is partially immersed in a reservoir of liquid metal compatible with the semiconductor and an electric current is passed through the sample causing impurities contained therein to migrate into the liquid metal electrode. While useful for removing impurities from metallic semiconductors, this method of purifying semiconducting materials is ineffective for nonmetallic, ionic, semiconducting compounds such as $HgI_2$. Furthermore, the '087 invention requires the use of additional hazardous materials such as mercury or cadmium.

SUMMARY OF THE INVENTION

The present invention discloses a simple technology for producing purified ionic semiconducting materials, in particular PbI$_2$ and preferably HgI$_2$, useful for room temperature radiation detecting devices, which produces high yields of purified product, requires minimal handling of the material thereby reducing the possibility of introducing or reintroducing impurities into the material, is easy to control, is highly selective for impurities, retains the stoichiometry of the material and employs neither high temperatures nor hazardous materials such as solvents or liquid metals.

In this process an electric field is applied to a bulk sample of the ionic semiconducting material causing impurities present in the sample to drift in a preferred direction. After all of the impurities have been transported to the ends of the sample the current flowing through the sample, a measure of the rate of transport of mobile impurities, falls to a low, steady state value, at which time the end sections of the sample where the impurities have concentrated are removed leaving a bulk sample of higher purity material. Because the method disclosed here only acts on the electrically active impurities, the stoichiometry of the host material remains substantially unaffected.

In contrast to metals and polar semiconductors where conduction is electronic in nature, conduction in ionic solids is by the movement of ions. In order for conduction to take place in a normally non-conducting solid ions must either occupy interstitial sites (Frenkel defects) or vacancies (Schottky defects) must be introduced in normal lattice positions. In general, a large fraction of impurity ions will occupy intersitial sites in the crystal lattice; they will act as Frenkel defects. Providing reactions at the electrodes do not result in either the insertion into or removal from the crystal lattice of species, application of an electric field will cause mobile species, e.g., Frenkel defects, to move through the lattice.

As is known in the art and discussed, for example, in A. J. Dekker, *Solid State Physics*, Prentice-Hall, 1957, pp. 175–182, application of an electric field across a crystalline sample has been used to obtain information on the nature of the conduction process in solids, the extent of ionic conductivity in a solid material and the identity of the ionic conductors, and the rate of charge transfer through the solid . The invention disclosed herein employs the same principle, application of an electric field across a crystalline sample of a nonmetallic semiconducting material, preferably HgI$_2$, causing electrically active species present in the sample to drift toward one or the other of the electrodes placed at opposite sides of the sample. For the purposes of the invention disclosed herein and the discussion pertaining thereto migration of electrically active impurities present in nonmetallic, ionic semiconductors under the influence of an applied electric field is termed electrodrift.

It is an object of this invention to use electrodrift to provide a simple, inexpensive method for producing high purity nonmetallic semiconducting materials, preferably HgI$_2$, for use in radiation spectroscopy at room temperature and particularly for use in high resolution x-ray and $\gamma$-ray spectroscopic devices wherein electrodes are attached to an impure sample of HgI$_2$ and an electric field of appropriate strength is applied across the impure sample of HgI$_2$. When the current drops to a steady state value, the power supply is shut off. Then the ends of the sample to which the electrodes have been attached and to which the electroactive impurities present in the HgI$_2$ have migrated are removed. Another object of this invention is to provide a method of purifying bulk HgI$_2$ which is in the form of polycrystals.

The objects of the present invention together with additional objects, novel features and advantages thereof over existing prior art forms, which will become apparent to those skilled in the art from detailed disclosure of the present invention as set forth hereinbelow, are accomplished by the improvements herein described and claimed.

2a) Cu film biased at +350 V.

2b) Cu film biased at -350 V.

Figure 3:
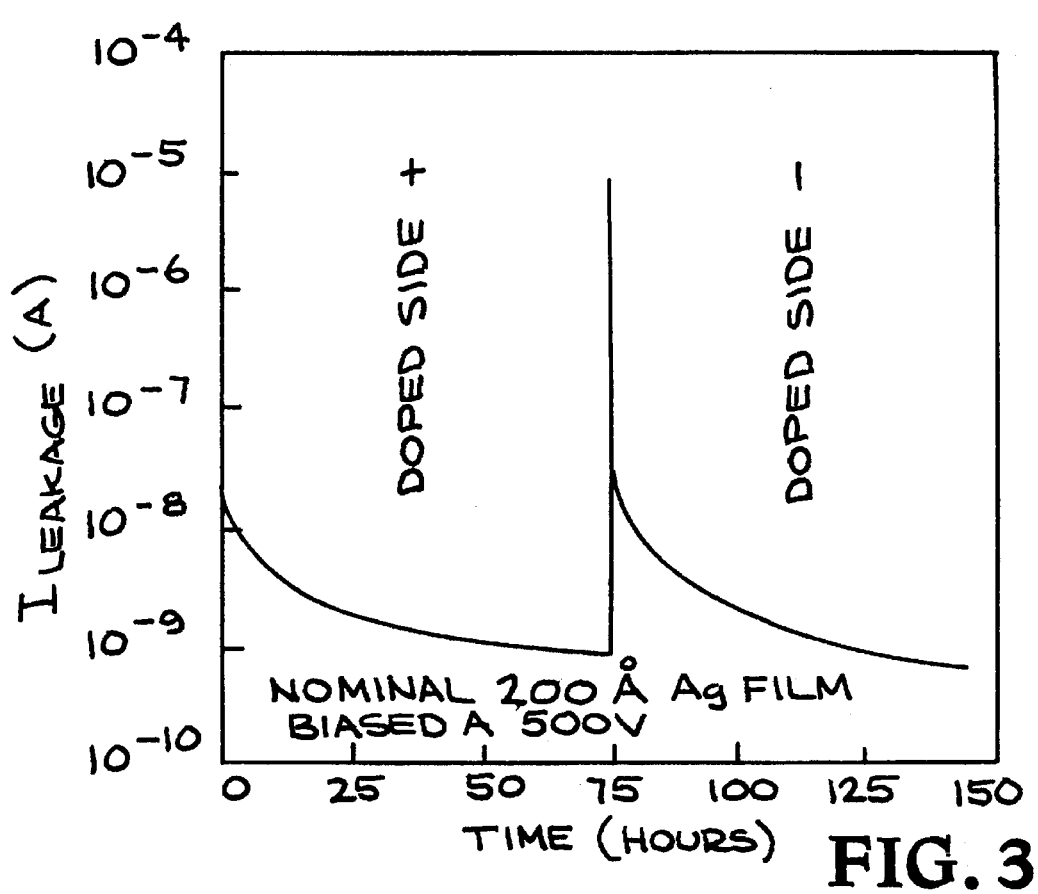

FIG. 3 shows the effect of periodic electric field reversal on the electrodrift current for Ag films.

DETAILED DESCRIPTION OF THE INVENTION

Figure 1:
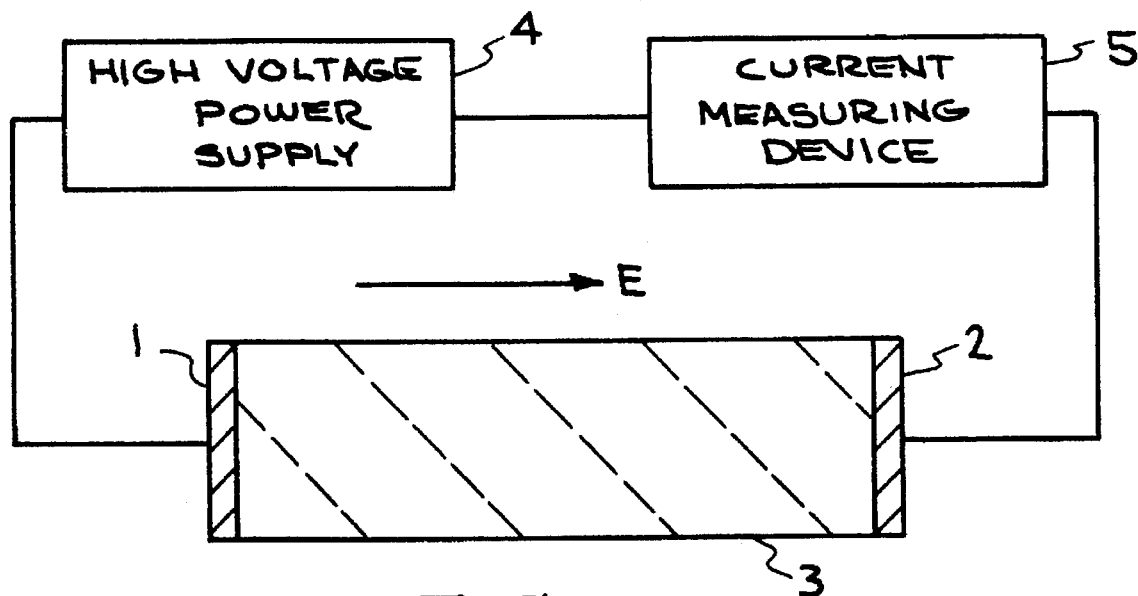
FIG. 1 is a schematic diagram of the components of the electrodrift method for purifying HgI$_2$ crystals.

The method of purifying radiation detector materials, in particular HgI$_2$, disclosed herein utilizes an electric field applied to a bulk polycrystalline mass by means of electrodes attached to opposite ends of the sample, to cause electrically active impurities to drift through the sample matrix toward the charged electrodes. It is known that many of the impurities which exist in, for example HgI$_2$, are electrically active, including the more common impurities such as Cu, Ag and Zn. Applying an electric field across a sample of HgI$_2$ causes these impurities to move through the sample and concentrate in the vicinity of the electrodes. After all of the impurities have been transported to the electrodes those portions which now contain high concentration of impurities can be removed, leaving a bulk sample of higher purity material for crystal growth and device fabrication. FIG. 1 illustrates an embodiment of the method and apparatus for purifying nonmetallic, crystalline semiconductor materials.

Electrodes 1 and 2, preferably made of Pd, are applied to the opposite ends of a sample 3 to be purified by methods known in the art such as vapor deposition, sputtering, painting, evaporation or mechanical fastening. An electric field of at least 1 kV/cm is applied between electrodes 1 and 2 by means of a high voltage power supply 4. The voltage is controlled at a fixed value in the range of from about $10^3$ V/cm to about $10^4$ V/cm and a current measuring device 5 is used to measure and monitor the current flowing through the circuit comprised of electrodes 1 and 2 and sample 3. When the current flowing through the sample has fallen to a low and essentially constant value, generally at most $10^{-12}$ A/cm$^2$, indicating the bulk of the charge carrying impurities have migrated to the electrodes, the power supply is shut off and the ends of the sample, which now contain the electroactive impurities concentrated therein, are removed. The leakage current-time profile assists in monitoring the progress of the purification. In particular, the asymptotic approach of the current-time curve to a steady state value (tailing) indicates when the purification is essentially complete. Once the leakage current has settled to a slowly changing level in the range of about $10^{-12}$ A/cm$^2$, little further movement of impurities can be expected.

In order to demonstrate that impurities present in HgI$_2$ can be caused to move under the influence of an applied electric field as well as illustrate embodiments of this invention a series of experiments was conducted as described hereinbelow.

EXAMPLE 1

Figure 2A:
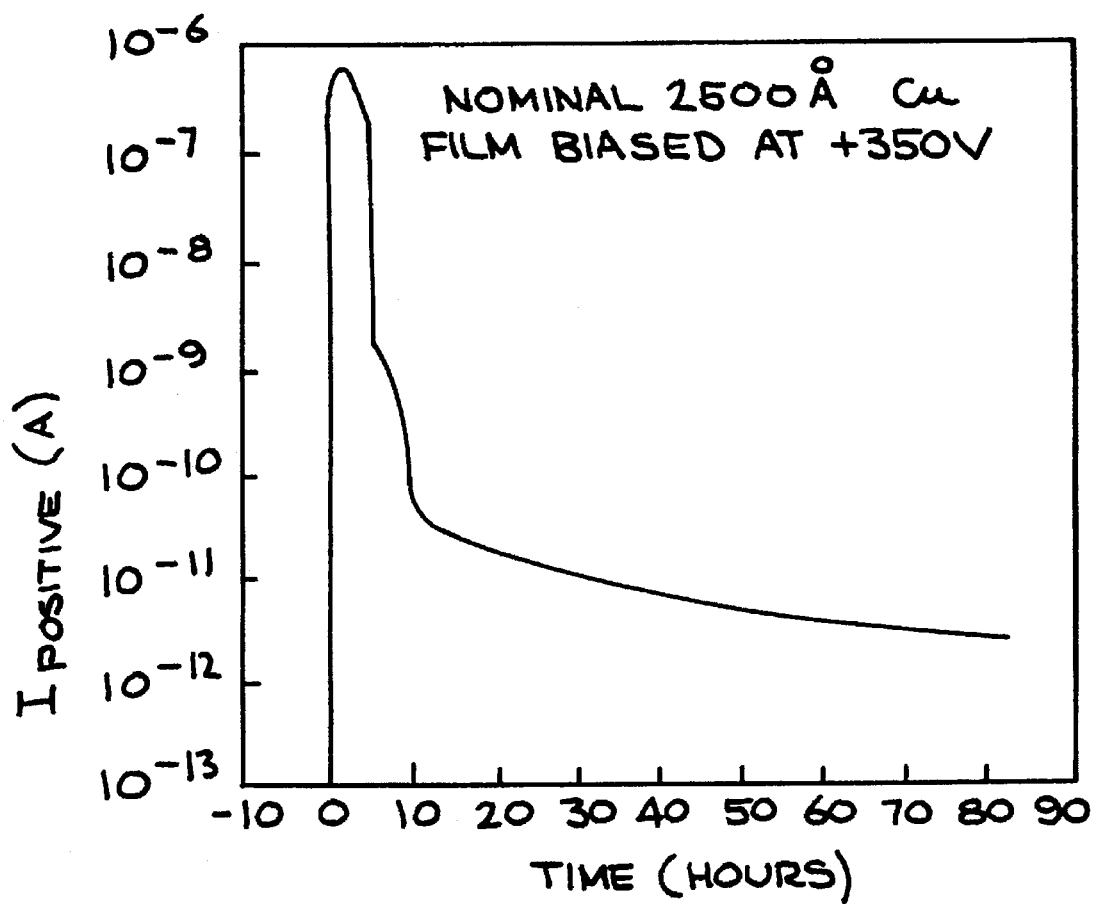
FIG. 2a and 2b show the electrodrift current vs time for Cu films on HgI$_2$ crystals.
Figure 2B:
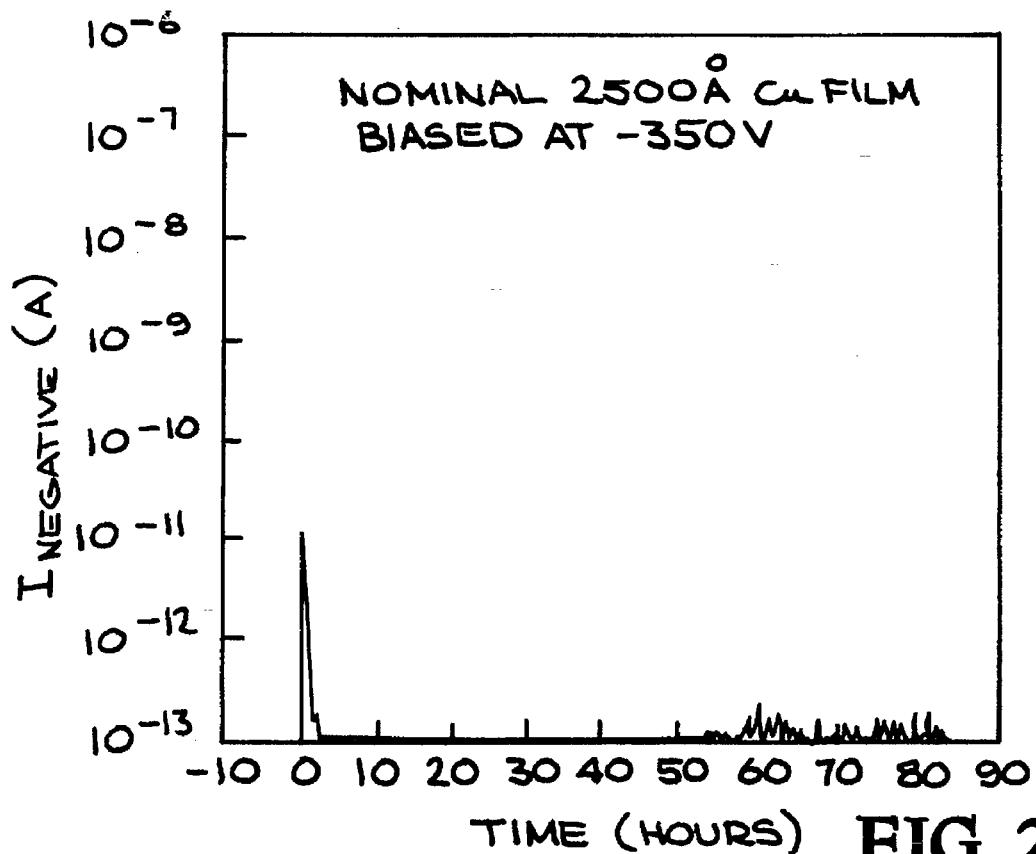

A 2500 Å Cu film was sputter deposited on one side of a sample of HgI$_2$ approximately 350 μm thick and a colloidal graphite electrode was applied to the opposite side of the sample as discussed earlier, supra. A potential of 350 V was applied across the sample. When the Cu electrode was made the positive electrode there was a large, sharp current peak of about $10^{-6}$ A observed in the first four to five hours, FIG. 2a. After about ten hours this current peak rapidly decreased to a steady state value of about $3\times10^{-12}$ A. The large current may be caused by the rapid movement of positively charged Cu-based impurities away from the positive contact and across the bulk of the $HgI_2$. As the Cu impurities concentrated at the electrodes, no longer able to migrate across the sample, the current fell. The small steady state value of the current indicated that the majority of the charge carrying impurities had concentrated at the electrodes. The experiment was repeated and the Cu electrode was made the negative electrode; only a very small current response was obtained, FIG. 2b. The small current at the beginning may have originated from the movement of the few impurities that had diffused into the $HgI_2$ prior to the application of bias voltage. These results showed that the Cu-based impurity was electrically positive, and readily moved by electric fields of the magnitude typically found in detectors, on the order of 1 V/μm.

EXAMPLE 2

A silver film 0.635 cm in diameter and 200 Å thick was sputter deposited on one side of a 1 cm square by 1 mm thick $HgI_2$ slab and a colloidal graphite electrode was applied to the opposite side. A potential of 500 V, corresponding to an electric field of 0.5 V/μm, was applied across the $HgI_2$ sample with the Ag film being the positive electrode. As shown in FIG. 3, a current/time curve similar to that of FIG. 2 was recorded. From this curve it was determined that approximately $3.8\times10^{-3}$ C of charge had passed through the $HgI_2$ sample. When the polarity of the electrodes was reversed and the experiment repeated a total charge of $3.1\times10^{-3}$ C was moved; approximately 82% of the Ag was recovered the rest being either deposited at the electrode or pinned in the bulk or combinations thereof.

EXAMPLE 3

A polycrystalline sample of mercuric iodide was fabricated into a rod 7 mm in diameter and 25 mm long. Colloidal graphite electrodes were painted onto each end of the rod to serve as electrical contacts. A potential of about 1.1 kV was applied and the current monitored as described earlier, supra. When the leakage current had fallen to $10^{-8}$ A the power supply was shut off. The sample was cut into 3 equal size pieces; a positive electrode piece, a center piece and a negative electrode piece. To determine the impurity content and to provide a higher level of accuracy, each piece was analyzed using both Inductively Coupled Plasma Optical Emission Spectroscopy (ICP-OES) and Inductively Coupled Plasma Mass Spectroscopy (ICP-MS). The results of this analysis, shown in Table 2, are the average of the results of the two analysis methods.

TABLE 2

| | [Concentration (ppm)] | | | |
|---|---|---|---|---|
| Element | Initial Concentration | Positive Electrode | Center | Negative Electrode |
| Ag | 0.1 | 0.001 | 0.001 | 0.8 |
| Zn | 3.6 | 0.72 | 1.5 | 13 |
| Cu | 3.2 | 1.2 | 5.0 | 12 |

It is evident from these results that the electrodrift method of purifying $HgI_2$ was completely successful for Ag and Zn. Although the process was not yet complete for Cu when the experiment was terminated, a significant concentration gradient has been established showing that Cu was moving through the sample toward the negative electrode, as expected. Extending the electrodrift experiment until the steady state current had dropped to a lower value would have resulted in an equally dramatic decrease in the Cu concentration in the $HgI_2$ sample.

While the method of this invention improves upon present techniques by not requiring heating, raising the temperature of the sample undergoing purification by electrodrift slightly may afford certain benefit by increasing the mobility of the impurities.

From the foregoing description and examples, one skilled in the art can readily ascertain the essential characteristics of the present invention. The descriptions and examples are intended to be illustrative of the present invention and are not to be construed as limitations or restrictions thereon, the purview of the invention being delineated in the following claims.

We claim:

1. A method for removing impurities from a semiconducting material useful as a radiation detector, comprising the steps of:

a) providing a semiconducting material containing impurities;

b) applying a first and a second electrode to opposite ends of the semiconducting material;

c) applying a voltage between the electrodes thereby establishing an electric field through the semiconducting material, the electric field causing impurities to migrate to the electrodes, thereby establishing a current;

d) shutting off the voltage when the current has fallen to a steady state value; and e) removing the electrodes and portions of the semiconducting material adjacent thereto wherein the impurities have concentrated.

2. The method of claim 1 wherein the semiconducting material is selected from the group consisting of mercuric iodide, lead iodide, thallium bromide, thallium bromoiodide and mercuric bromoiodide and combinations thereof.

3. The method of claim 1 wherein the material is polycrystalline.

4. The method of claim 1 wherein the material is a single crystal.

5. The method of claim 1 wherein the step of applying electrodes is vapor deposition, sputtering, painting or mechanical fastening and combinations thereof.

6. The method of claim 1 wherein the electric field is at least 1 kV/cm.

7. The method of claim 1 wherein the steady state value of the current is less than about $10^{-9}$ A/cm$^2$.

8. The method of claim 1 wherein said semiconducting material is heated to a temperature below the melting point of the material.

9. A method of purifying HgI2 comprising the steps of:

a) providing a sample of HgI2;

b) applying a first and a second electrode to opposite ends of the sample of HgI2;

c) applying a voltage between the electrodes thereby establishing an electric field through the HgI2, the electric field causing impurities to migrate to the electrodes, thereby establishing a current;

d) shutting off the voltage when the current has fallen to a steady state value; and e) removing the electrodes and portions of the sample adjacent thereto wherein the impurities have concentrated.

10. The method of claim 9 wherein the step of applying electrodes is vapor deposition, sputtering, painting or mechanical fastening and combinations thereof.

11. The method of claim 9 wherein the electrodes are graphite, palladium, platinum or gold and combinations thereof.

12. The method of claim 9 wherein the electric field is about 1 kV/cm.

13. The method of claim 9 wherein the steady state value of the current is less than about $10^{-9}$ A/cm$^2$.

14. The method of claim 9 wherein the sample is a single crystal.

15. The method of claim 9 wherein the sample is polycrystalline.

16. The method of claim 15 wherein the sample is a rod.

* * * * *